United States Patent
Woodruff

(10) Patent No.: US 10,086,910 B2
(45) Date of Patent: Oct. 2, 2018

(54) BATTERY SYSTEM FOR BOATS

(71) Applicant: RAIDER OUTBOARDS, INC., Titusville, FL (US)

(72) Inventor: George Woodruff, Palmetto, FL (US)

(73) Assignee: RAIDER OUTBOARDS, INC., Titusville, FL (US)

(*) Notice: Subject to any disclaimer, the term of this patent is extended or adjusted under 35 U.S.C. 154(b) by 0 days.

(21) Appl. No.: 15/583,179

(22) Filed: May 1, 2017

(65) Prior Publication Data

US 2017/0313387 A1    Nov. 2, 2017

Related U.S. Application Data

(60) Provisional application No. 62/329,558, filed on Apr. 29, 2016.

(51) Int. Cl.
*B63B 7/08* (2006.01)
*H01M 10/42* (2006.01)
*H01M 2/10* (2006.01)
*H01M 2/20* (2006.01)
*H01M 10/48* (2006.01)
*B63H 20/00* (2006.01)
*B63H 21/17* (2006.01)

(52) U.S. Cl.
CPC ........... *B63B 7/082* (2013.01); *B63H 20/007* (2013.01); *H01M 2/1077* (2013.01); *H01M 2/1083* (2013.01); *H01M 2/206* (2013.01); *H01M 10/425* (2013.01); *H01M 10/482* (2013.01); *H01M 2010/4271* (2013.01); *H01M 2010/4278* (2013.01); *H01M 2220/20* (2013.01)

(58) Field of Classification Search
CPC ...... B63B 7/082; B63H 20/007; H01M 2/206; H01M 2/1083; H01M 2/1077; H01M 10/482; H01M 2220/20; H01M 2010/4271; H01M 10/425; H01M 2010/4278; B63J 2003/002
USPC ............................................................ 440/6
See application file for complete search history.

(56) References Cited

U.S. PATENT DOCUMENTS

| 5,378,555 | A | 1/1995 | Waters et al. |
| 5,567,544 | A | 10/1996 | Lyman |
| 2009/0139781 | A1* | 6/2009 | Straubel ............. B60L 11/1875 180/65.1 |
| 2012/0125702 | A1* | 5/2012 | Bergfjord ................ B60K 1/04 180/65.1 |
| 2017/0015397 | A1* | 1/2017 | Mitchell ................ B63H 21/17 |
| 2017/0253313 | A1* | 9/2017 | Easterling .............. B63C 11/46 |

* cited by examiner

*Primary Examiner* — Anthony D Wiest
(74) *Attorney, Agent, or Firm* — Mannava & Kang, P.C.; Eliot R. Malamud

(57) ABSTRACT

A battery system for providing electric power to a boat includes a hard deck that includes a plurality of interconnected battery panels and output power connectors. Each of the battery panels includes an array of interconnected battery cells. A connection plate receives recessed edges of adjacent battery panels and interconnect cables connect battery terminals of the adjacent battery panels.

13 Claims, 6 Drawing Sheets

BATTERY SYSTEM FOR BOATS

CLAIM FOR PRIORITY

The present Application for Patent claims priority to U.S. Provisional Application No. 62/329,558 entitled "Battery Electric System for Boats" filed Apr. 29, 2016, assigned to the assignee hereof and hereby expressly incorporated by reference herein.

TECHNICAL FIELD

The disclosed embodiments relates generally to electrical systems for boats. More particularly, the invention relates to battery systems for rigid inflatable boats (RIBs).

BACKGROUND

RIBs, rigid inflatable hulls and conventional boats exist in different configurations and are used for recreation, military and search and rescue missions and include outboard motors attached to a transom.

Outboard motors for RIBs and other boats are typically powered by gasoline, kerosene-type jet fuels, diesel, and biodiesels. The latest development in outboard motor technology includes a total electric outboard motor.

Marine battery systems provide power for outboard motors, as well as for other electric powered accessories, including GPS, radar, and radio systems. Marine batteries are typically heavy and bulky, and the number of battery cells required to power the new totally electric outboard motors makes placement of the batteries in the boat critical so as not to place the weight in one area of the boat.

BRIEF DESCRIPTION OF THE DRAWINGS

The embodiments are described in detail in the following description with reference to the following figures. The figures illustrate examples of the embodiments.

DETAILED DESCRIPTION

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details.

Figure 1:
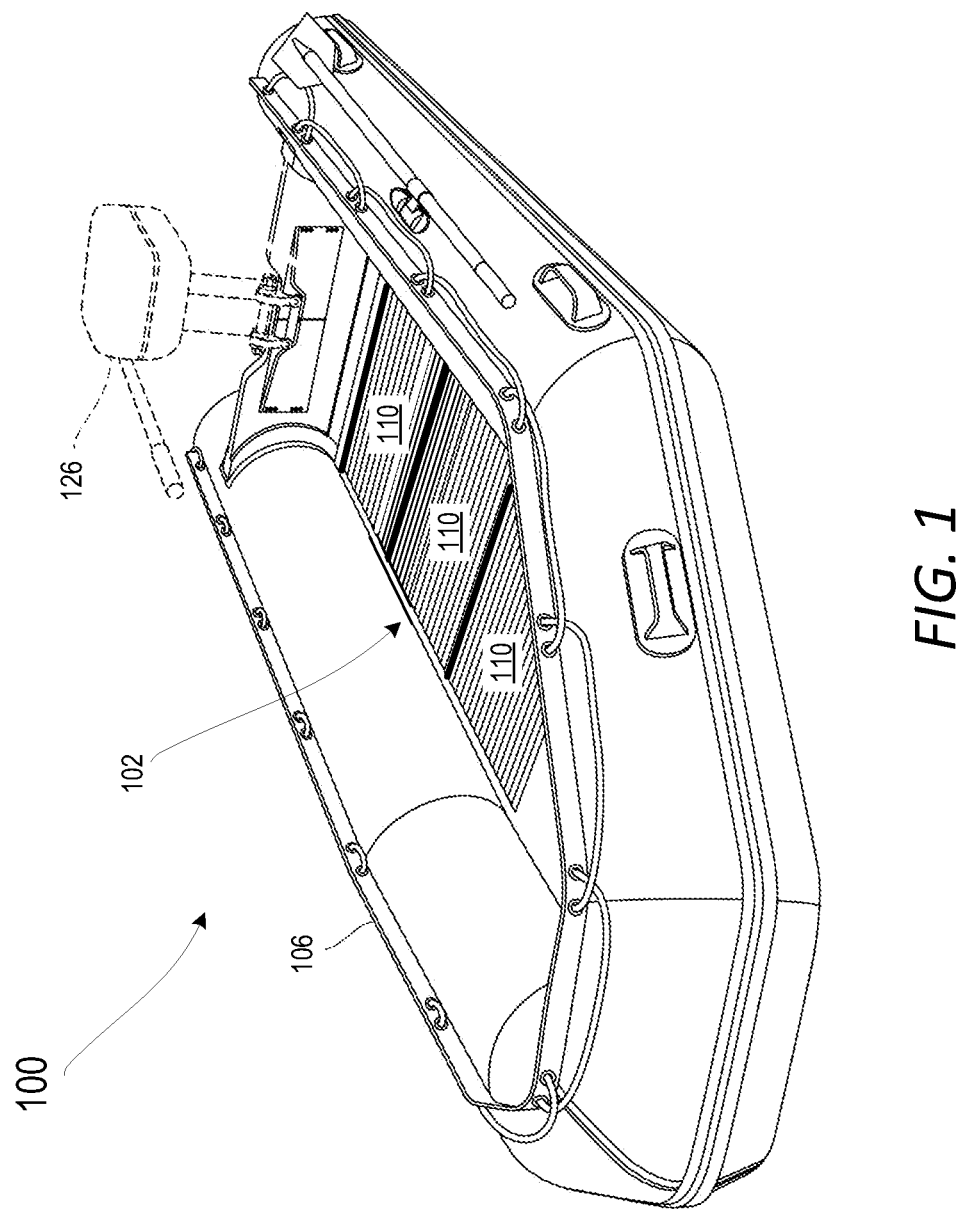
FIG. 1 is an environmental view of a battery system mounted in a RIB according to examples of the present disclosure.

FIG. 1 is a perspective view of a battery system 100 that forms a hard deck 102 within a RIB 106. In an example, the hard deck 102 is formed by three interlocking battery panels 110 (hereinafter "panels 110") that when lock together, create a firm surface that may support personnel and equipment. In an example, panels 110 include a grid of interconnected rechargeable battery cells 302, as shown in the cutaway section of panel 110 in FIG. 3. The composition of battery cells 302 includes material such as Nickel Cadmium (NiCd), Nickel-Metal Hydride (NiMH), lead acid, Lithium Ion, and Lithium Polymer type batteries.

Figure 2:
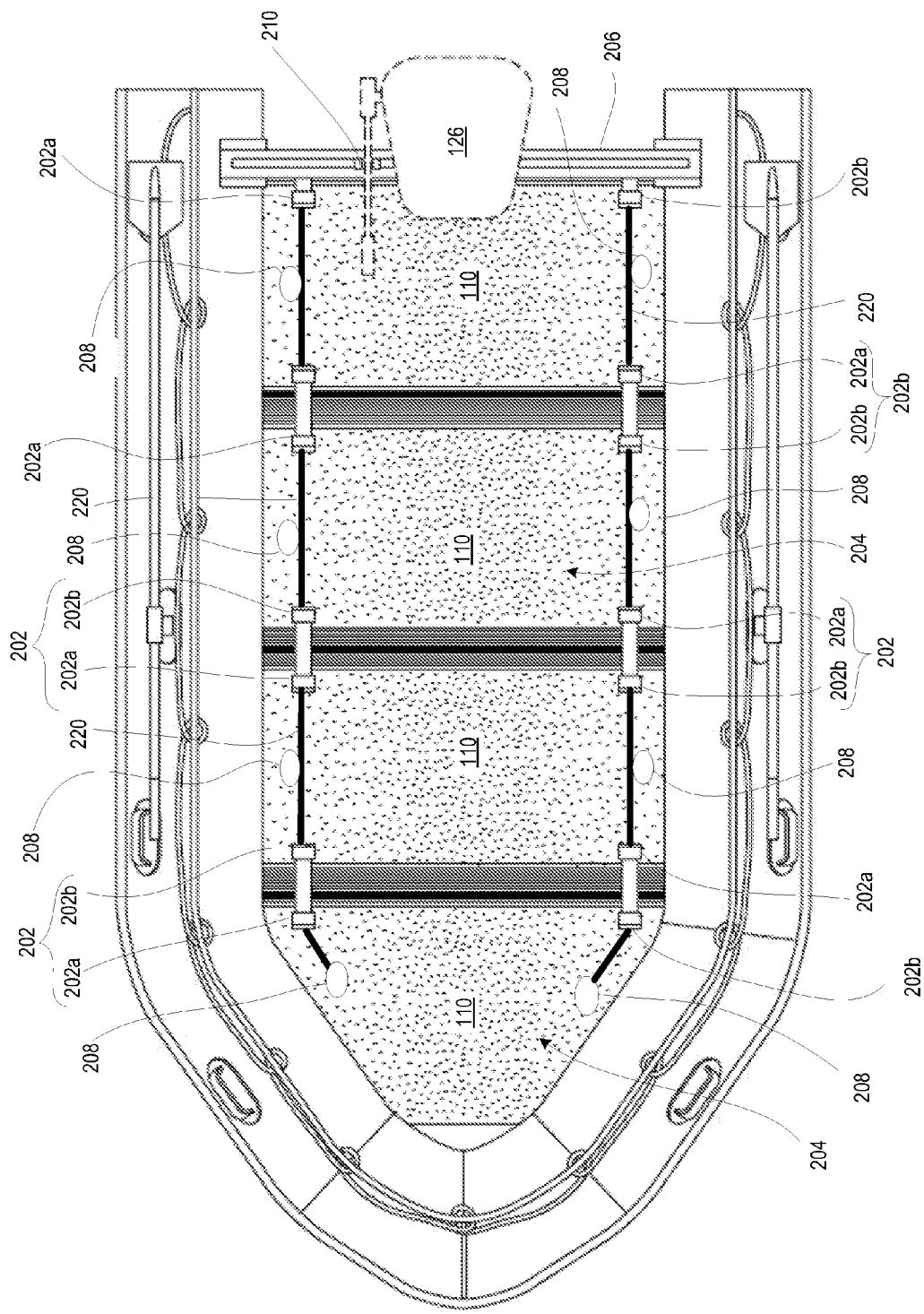
FIG. 2 illustrates a top down view of the RIB and battery system depicted in FIG. 1.

FIG. 2 depicts a top down view of the RIB 106 and the battery system 100 depicted in FIG. 1. In an example, panels 110 provide electric power to an electric outboard motor 126 and tiller control unit 210. In another example, one or more of panels 110 stores natural gas which is supplied to a natural gas driven outboard motor (not shown). When one or more of the panels 110 store natural gas, the gas filled panels 110 includes fill, relief, and output ports for the natural gas.

Figure 3:
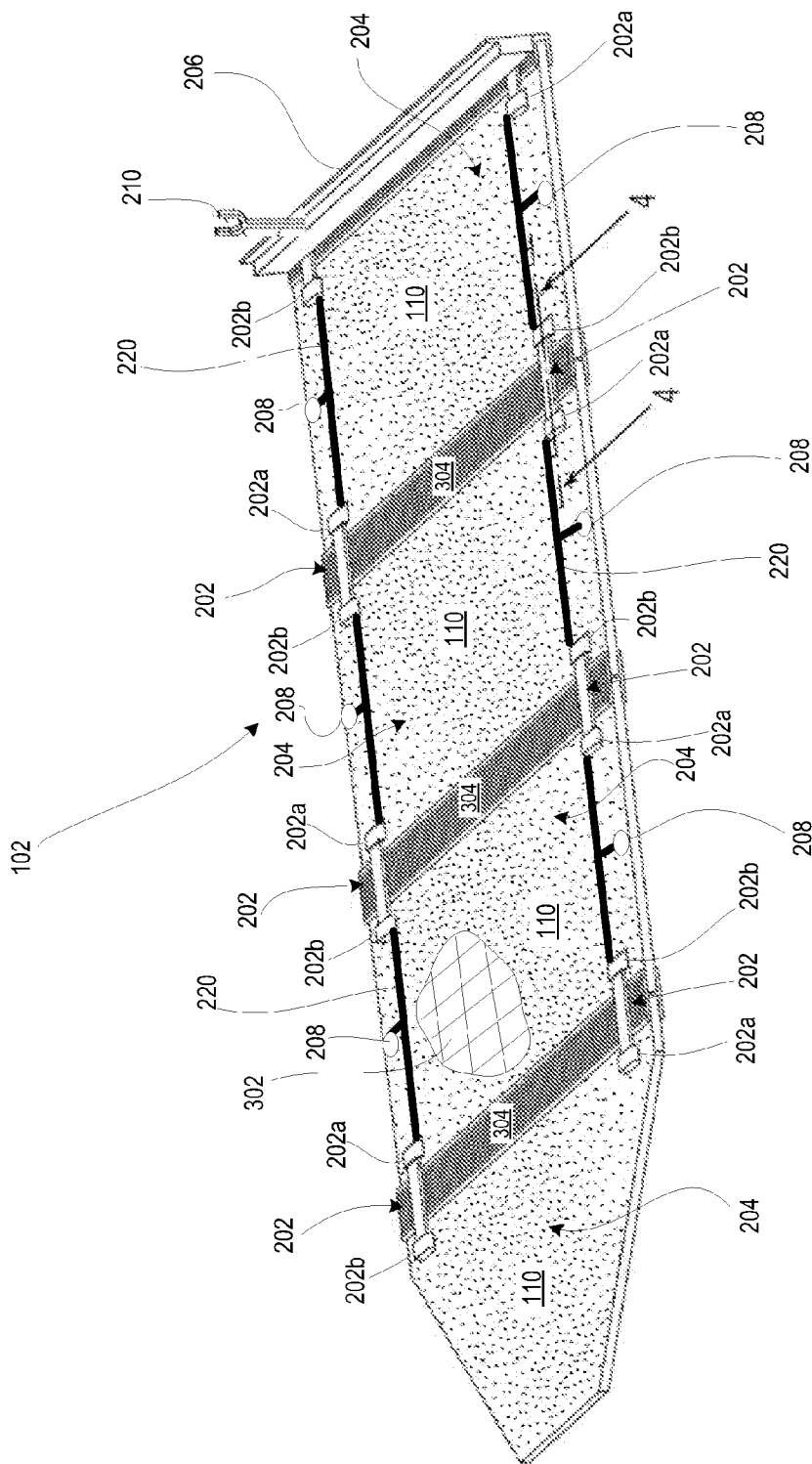
FIG. 3 illustrates a hard deck that includes the battery system depicted in FIG. 1.

FIG. 3 depicts three panels 110 interconnected via connection plate 304 to form hard deck 102. Each panel 110 is formed of interconnected battery cells 302. To interconnect adjacent panels 110, recessed edges of panels 110 are wedged into opposing sides of connection plate 304. In an example, connection plate 304 is formed of a resilient material to provide flexibility in the hard deck 102. In an example, a surface of connection plate 304 is textured to provide a non-skid surface.

When panels 110 are interlocked, waterproof interconnect cables 202 provide electrical continuity and distribute status information between panels 110 via a power management system 206 that includes connectors 208 and at least one channel 220 disposed beneath or flush with the surface of the hard deck 102. In an example, connectors 208 are integrated into the panels 110 and are connected to the power management system 206. Connectors 208 are disposed at convenient locations in panels 110 and in an example include electric power outlets to provide electricity at a specific voltage and power.

Connectors 208 provide one or more output voltage, e.g., 12 VDC, 24 VDC, or other voltage, directly to deck locations where the voltage is required. Connectors 208 include a communication interface to allow personnel to communicate with each other from different locations within the RIB 106.

The hard deck 102 include an outer covering 204 made of a waterproof and flexible material that seals each panel 110 against the marine environment and physical damage. In an example, outer covering 204 includes a skid proof or carpeting material. The hard deck 102 is expandable to support batteries of various physical types and characteristics. In an example, the panels 110 expand from approximately ½ inch to over one inch in depth to support different battery types.

Figure 4A:
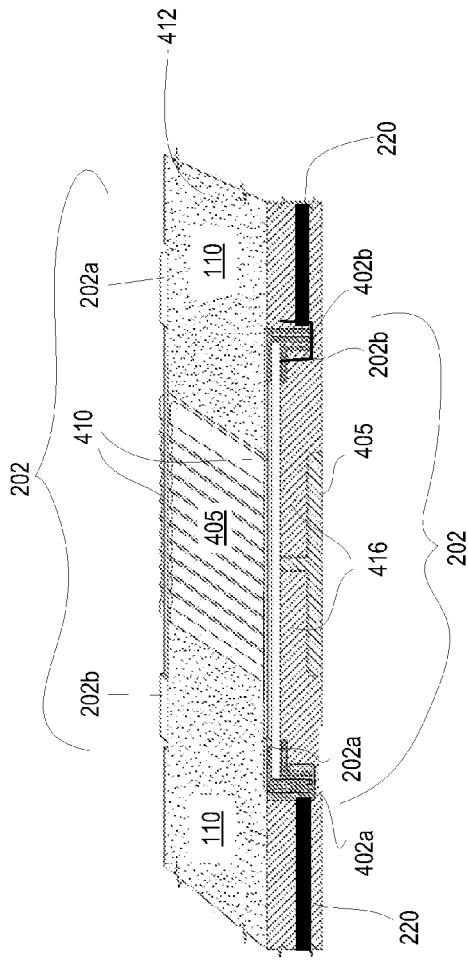
FIGS. 4A and 4B illustrate interconnection between adjacent battery panels according to the battery system depicted in FIG. 1.
Figure 4B:
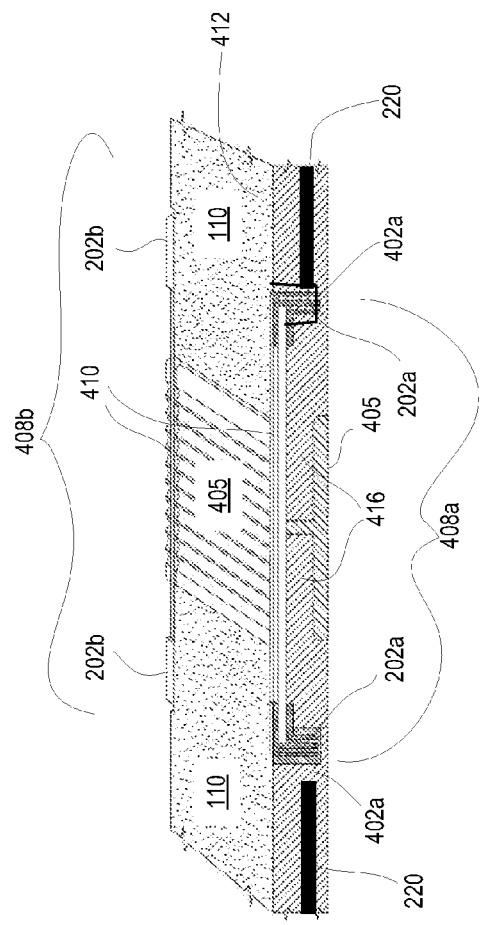

FIGS. 4A and 4B depict two examples of the interconnection between adjacent panels 110. A connection plate 405 receives recessed edges 416 of adjacent panels 110 such that an upper surface of the connection panel lies flush with upper surfaces 412 of the panels 110.

In one example, FIG. 4A depicts one end 202a of interconnect cable 202 keyed to mate with a positive battery terminal 402a disposed within panel 110, and a second end 202b of interconnect cable 202 mating with a negative battery terminal 402b of panel 110. As such, depending on the orientation of connectors 202a and 202b on interconnect cable 202, two adjacent panels 110 may be connected positive battery terminal to negative battery terminal or negative battery terminal to positive battery terminal.

In an example, channels 410 are recessed in the upper surfaces 412 of panels 110 to receive interconnect cables 202 and 408 and connector plate 405 so that the hard deck 102 presents no protrusions that might create a tripping hazard.

Still further, FIG. 4B depicts an example in which an interconnect cable 408a includes two of a same connector 202a to provide connectivity between a positive battery terminal 402a of one panel 110 and a positive battery terminal 402a of an adjacent panel 110. Interconnect cable 408b includes two connectors 202b to provide connectivity between two negative battery terminals on adjacent panels 110. As such, different configurations of interconnect cables 202, 408a, and 408b allow panels 110 to be interconnected in series and/or in parallel to provide one or more required voltages and power requirements. Still further, in another example (not shown), the positive (402a) and negative (402b) battery terminals in panel 110 may be generic and require a same connector type, thus permitting a single panel interconnect cable type to be used for all configurations.

Figure 5:
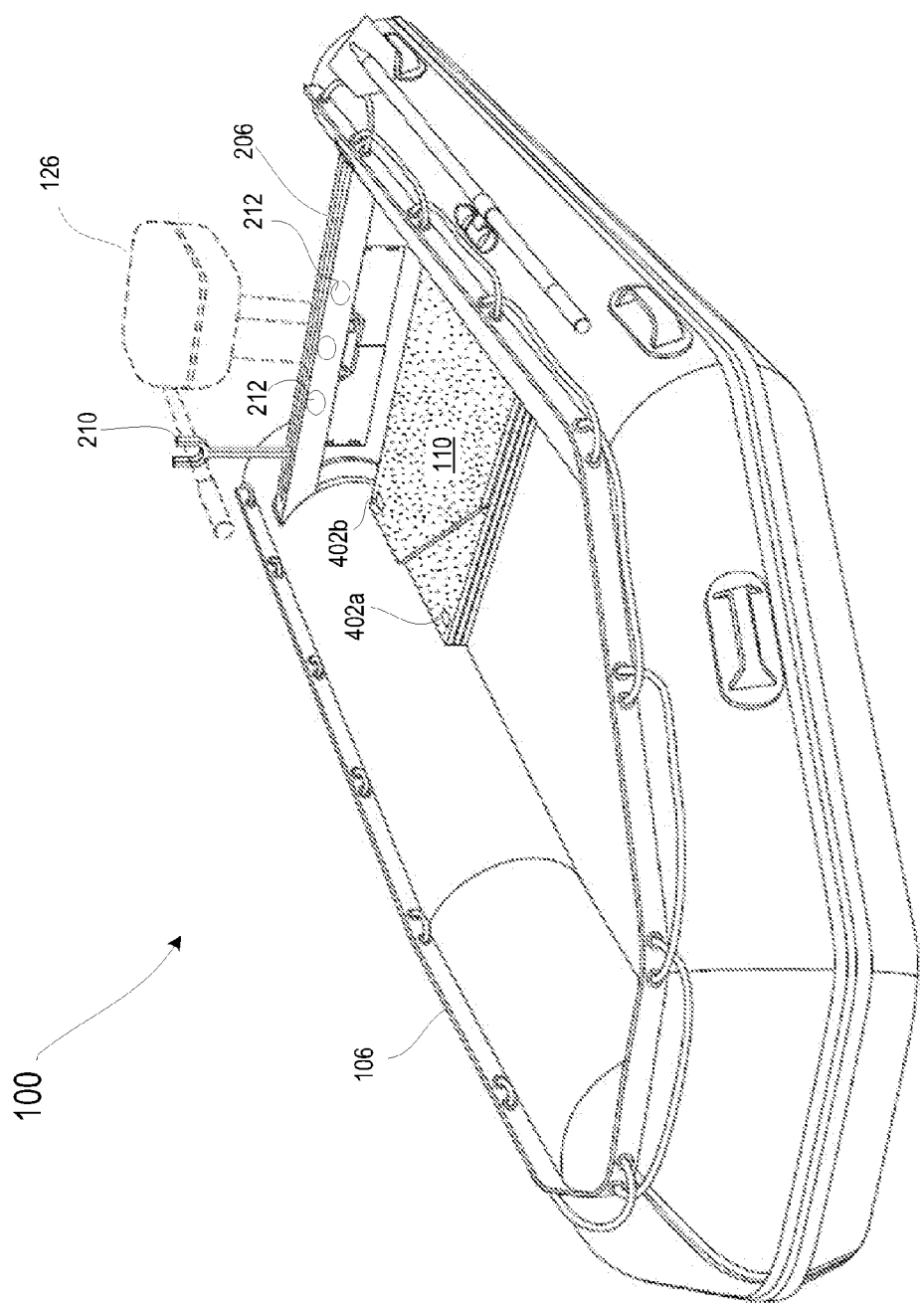
FIG. 5 is an environmental view of an RIB with stacked battery panels according to the battery system depicted in FIG. 1.

FIG. 5 depicts panels 110 folded or stacked within RIB 106. The battery system 100, including panels 110, are easily disassembled, stored, transported, and reassembled in another RIB 106. In an example, the power management system 206 includes at least one status indicator 212 to provide status information, e.g., full, medium, and low, for the battery system 100, including status information for each of the panels 110.

Figure 6:
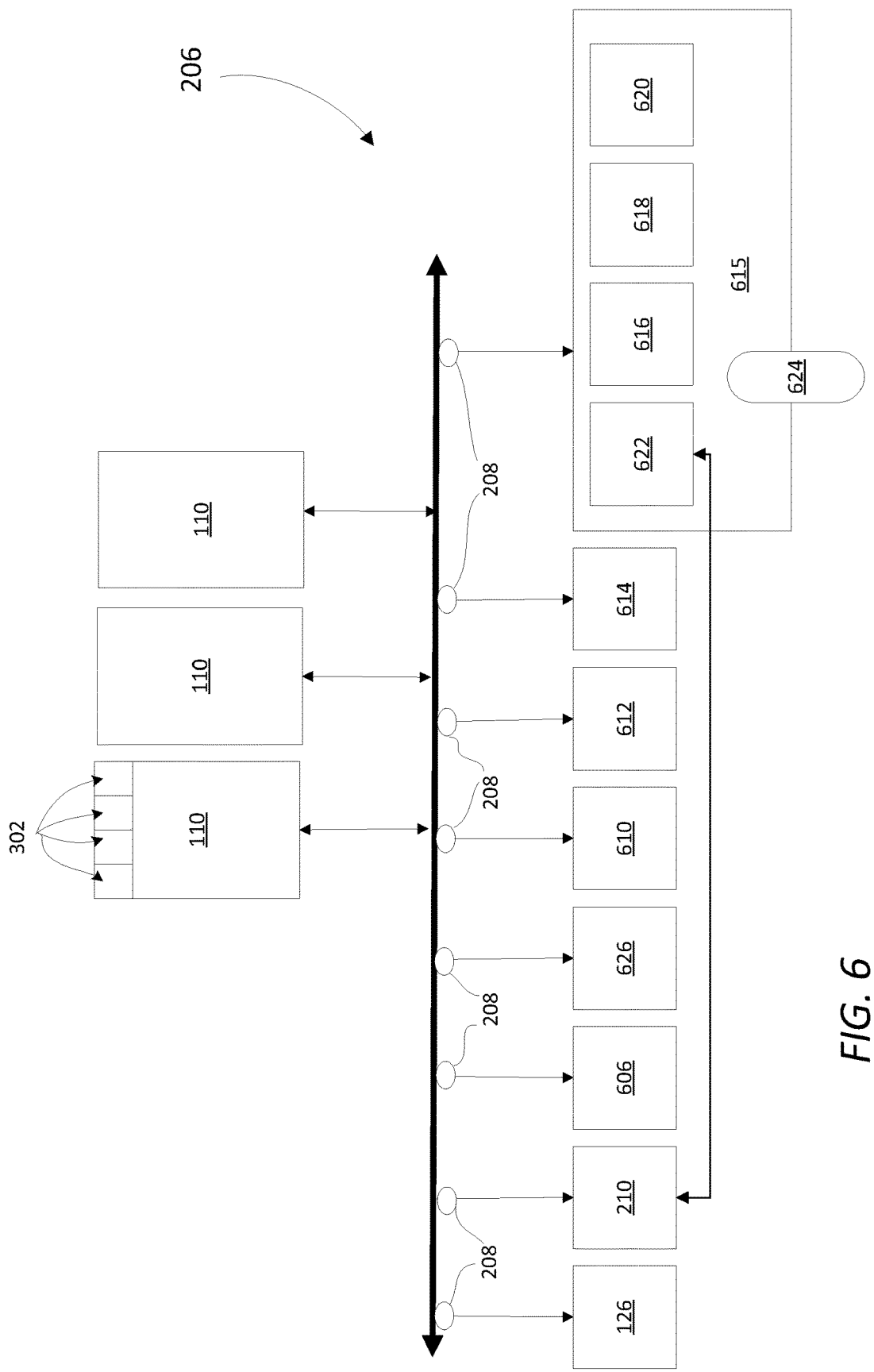
FIG. 6 illustrates a block diagram of components of the battery system depicted in FIG. 1.

FIG. 6 depicts a block diagram of the battery system 100 incorporated into the hard deck 102. The battery system 100 supports a charging system 606 connected to the power management system 206. In examples, charging system 606 includes a conventional AC/DC battery charger, a generator, and/or an array of solar cells. In an example, a DC/AC converter 408 is connected to the power management system 206 to provide AC power to AC driven equipment.

In an example, FIG. 6 depicts the battery system 100 providing power to the following devices.

Electric start and throttle control 610 to start and control outboard motor 126.

Rechargeable devices 612, including, e.g., phones, computers, etc.

A sonar system 614 built into an underneath portion of the hard deck 102.

Communications system 615. In an example, communication system 615 includes a computer 616, one or more radio systems 618 to communicate with a diver or other personnel within the RIB 106, and a Global Positioning System (GPS) receiver 620 or other location determining device, e.g., an Inertial Navigation System (INS). In an example, communication system 615 includes a wired and/or wireless interface to allow communication with personnel within the RIB 106 via a communication channel integrated within the power and status distribution system 206.

In an example, an automated pilot system 622 is integrated into the communication system 615. In an example, the automated pilot system 622 includes a heading sensor, e.g., a fluxgate compass, and either a dedicated course computer or an interface to computer 616. The automated pilot system 622 is connected to the tiller control unit 210, e.g., a motor, hydraulic pump, or lead screw mechanism, the tiller control unit 210 to move a tiller of the outboard motor 126 based upon commands from of the automated pilot system 622.

In an example, an underwater hydrophone 626 and a waterproof acoustic pinging device ("pinger") 624 allow for tracking of a diver. The pinger 624 is removably inserted into the communications system 615. In an example, while the pinger 624 is inserted in the communications system 615, the computer 616 is continuously updated with the location of the RIB based on data from the GPS receiver 620. When the pinger 624 is removed from the communication system 615, the computer 616 records the location at which the pinger 624 was removed, allowing the RIB 106 to return to the recorded location. In an example, the pinger 624 is activated automatically when submerged in water, and sends out an audio signal at specific intervals to aid a diver in underwater navigation. In an example, the pinger 624 transmits an audio signal in the mid-frequency range (20-50 kHz), or in the low-frequency range (11-16 kHz) depending upon the required transmission range. The audio signal is picked up by the underwater hydrophone 626, which in an example is mounted to the RIB 106 or carried by a diver. The hydrophone 626 relays decibel intensity to a user via a visual or audible interface.

In an example, under control of computer 616, the tiller control unit 210, and the electric start and throttle control 610, the battery system 100 allows the RIB 106 to automatically navigate away from a recorded location after dropping off a diver and pinging device 624. In an example, computer 616 is programmed to cause the RIB 106 to automatically return to the location without user interaction after a predetermined amount of time or upon receipt of a signal from the diver via radio system 618.

While the foregoing disclosure shows illustrative embodiments, it should be noted that various changes and modifications could be made herein without departing from the scope of the described embodiments as defined by the appended claims.

Furthermore, although elements of the described embodiments may be described or claimed in the singular, the plural is contemplated unless limitation to the singular is explicitly stated.

What is claimed is:

1. An inflatable boat comprising:
A deck disposed in a bottom of the boat formed from a plurality of interlocking battery panels, wherein each battery panel of the plurality of battery panels includes an array of interconnected battery cells, wherein each battery panel includes at least two battery terminals to provide a DC output voltage, and wherein at least one of the at least two battery terminals of adjacent battery panels is a positive terminal and another of the at least two battery terminals is a negative terminal;
a connection plate to receive a recessed edge of adjacent battery panels of the plurality of battery panels, wherein the connection plate lies flush with upper and lower surfaces of the plurality of battery panels; and
a power management system, including:
interconnect cables to interconnect the battery terminals of the adjacent battery panels, wherein each interconnect cable of the interconnect cables comprises a first connector and a second connector different from the first connector, wherein the first connector is keyed to connect to the positive terminal and the second connector is keyed to connect to the negative terminal, and
wherein channels are recessed within the adjacent battery panels, and the interconnect cables are disposed within the channels and lay flush with an upper surface of the adjacent battery panels;
at least one electric power outlet disposed in the deck; and
a battery status indicator interface to receive and output status information from each of the plurality of battery panels.

2. The inflatable boat according to claim 1, wherein the boat is a rigid inflatable boat and the plurality of battery panels are expandable from ½ inch to over one inch in depth.

3. The inflatable boat according to claim 1, wherein the power management system includes a status indicator to provide status information for each of the plurality of battery panels.

4. The inflatable boat according to claim 1, further comprising a communication system, the communication system including a computer, a radio system, a GPS receiver, and an automated pilot system.

5. The inflatable boat according to claim 4, further comprising a tiller control unit connected to the communication system.

6. The inflatable boat according to claim 5, further comprising a waterproof acoustic pinging device removeably inserted into the communication system, wherein the computer records a current location of the boat in response to an indication that the pinging device is removed from the communication system.

7. The inflatable boat according to claim 1, wherein the deck further comprising a plurality of electric power outlets to provide at least one DC voltage to at least one electrical device.

8. The inflatable boat according to claim 1, wherein the array of interconnected battery cells comprise at least one of Nickel Cadmium (NiCd), Nickel-Metal Hydride (NiMH), Lithium Ion, and Lithium Polymer type batteries cells.

9. The inflatable boat according to claim 1, wherein the deck comprises an outer covering of a skid proof material.

10. An inflatable boat, comprising:
a deck comprising a plurality of battery panels disposed in a bottom of the inflatable boat, wherein each battery panel of the plurality of battery panels includes:
an array of interconnected battery cells;
recessed edges to be received by a connection plate;
at least two battery terminals to provide a DC output voltage, wherein at least one of the at least two battery terminals of the adjacent battery panels is a positive terminal and another of the at least two battery terminals is a negative terminal;
at least one electrical and communication channel recessed within the battery panel; and
at least one output power connector;
a connection plate to receive the recessed edges of adjacent battery panels of the plurality of battery panels; and
a power management system, including:
interconnect cables to interconnect the battery terminals of the adjacent battery panels, wherein the interconnect cables are to lie flush with upper surfaces of the adjacent battery panels, wherein each interconnect cable of the interconnect cables comprises a first connector and a second connector different from the first connector, wherein the first connector is keyed to connect to the positive terminal and the second connector is keyed to connect to the negative terminal, and wherein channels are recessed within the adjacent battery panels, and the interconnect cables are disposed within the channels and lay flush with an upper surface of the adjacent battery panels;
at least one electric power outlet disposed in at least one of the plurality of battery panels; and
a status indicator interface to receive and output status information from each of the plurality of battery panels.

11. The inflatable boat according to claim 10, wherein the plurality of battery panels are expandable from ½ inch to over one inch in depth.

12. The inflatable boat according to claim 10, wherein the deck further comprising a plurality of electric power outlets to provide at least one DC voltage to at least one electrical device.

13. The inflatable boat according to claim 10, wherein the array of interconnected battery cells comprise at least one of Nickel Cadmium (NiCd), Nickel-Metal Hydride (NiMH), Lithium Ion, and Lithium Polymer type batteries cells.

* * * * *